(12) United States Patent
Ackley et al.

(10) Patent No.: US 8,944,242 B2
(45) Date of Patent: Feb. 3, 2015

(54) METHOD AND APPARATUS FOR TRANSPORTING PELLET-SHAPED ARTICLES

(71) Applicant: Ackley Machine Corporation, Moorestown, NJ (US)

(72) Inventors: E. Michael Ackley, Mannington, NJ (US); Vincent M. DeLuccia, Jr., Riverside, NJ (US)

(73) Assignee: Ackley Machine Corporation, Moorestown, NJ (US)

( * ) Notice: Subject to any disclaimer, the term of this patent is extended or adjusted under 35 U.S.C. 154(b) by 129 days.

(21) Appl. No.: 13/692,860

(22) Filed: Dec. 3, 2012

(65) Prior Publication Data

US 2013/0277171 A1    Oct. 24, 2013

Related U.S. Application Data

(63) Continuation-in-part of application No. 29/418,591, filed on Apr. 18, 2012, now Pat. No. Des. 713,866.

(51) Int. Cl.
*B65G 47/04* (2006.01)
*B65G 47/24* (2006.01)
*B41F 17/36* (2006.01)

(52) U.S. Cl.
CPC ............... *B65G 47/24* (2013.01); *B41F 17/36* (2013.01)
USPC ................... 198/803.14; 198/867.11; 101/483

(58) Field of Classification Search
USPC ............. 198/867.01, 867.11, 867.12, 803.14, 198/383, 397.01; 101/483
See application file for complete search history.

(56) References Cited

U.S. PATENT DOCUMENTS

| 3,670,865 | A | * | 6/1972 | Garland ......................... 198/393 |
| 3,838,766 | A | * | 10/1974 | Wagers et al. ................. 198/380 |
| 4,657,130 | A | * | 4/1987 | Ackley et al. ............. 198/397.04 |
| 5,655,453 | A | | 8/1997 | Ackley |
| 5,988,364 | A | | 11/1999 | Boyce et al. |
| 6,390,280 | B1 | | 5/2002 | Boyce |
| 7,102,741 | B2 | | 9/2006 | Ackley, Jr. et al. |
| 7,311,045 | B2 | * | 12/2007 | Ackley et al. ................. 101/485 |
| 8,072,590 | B2 | | 12/2011 | Ackley, Jr. et al. |
| 8,141,697 | B2 | | 3/2012 | Ackley, Jr. |
| 8,220,619 | B2 | | 7/2012 | Ackley |
| 2010/0252401 | A1 | | 10/2010 | Ackley |

FOREIGN PATENT DOCUMENTS

EP    0 183 611 A2    6/1986

OTHER PUBLICATIONS

Design U.S. Appl. No. 29/418,591, filed Apr. 18, 2012, pending.
European Communication and Search Report for Application No. 13195580.9-1707 dated Feb. 20, 2014, 8 pages.

* cited by examiner

*Primary Examiner* — James R Bidwell
(74) *Attorney, Agent, or Firm* — Nixon & Vanderhye, P.C.

(57) ABSTRACT

A carrier bar to convey at least one pellet-shaped article along a predetermined conveyer path in a direction of travel, the carrier bar comprises at least one pocket adapted to receive a pellet-shaped article and each pocket having a pocket wall, and a product settling area included in each pocket and having a dimple defined in the product settling area by an edge, said dimple adapted to seat the bottom side of the pellet-shaped article, wherein said dimple is offset from a center of said product settling area and said dimple is shaped to position, hold, or bias a portion of the pellet-shaped article towards and/or against a portion of the pocket wall.

68 Claims, 16 Drawing Sheets

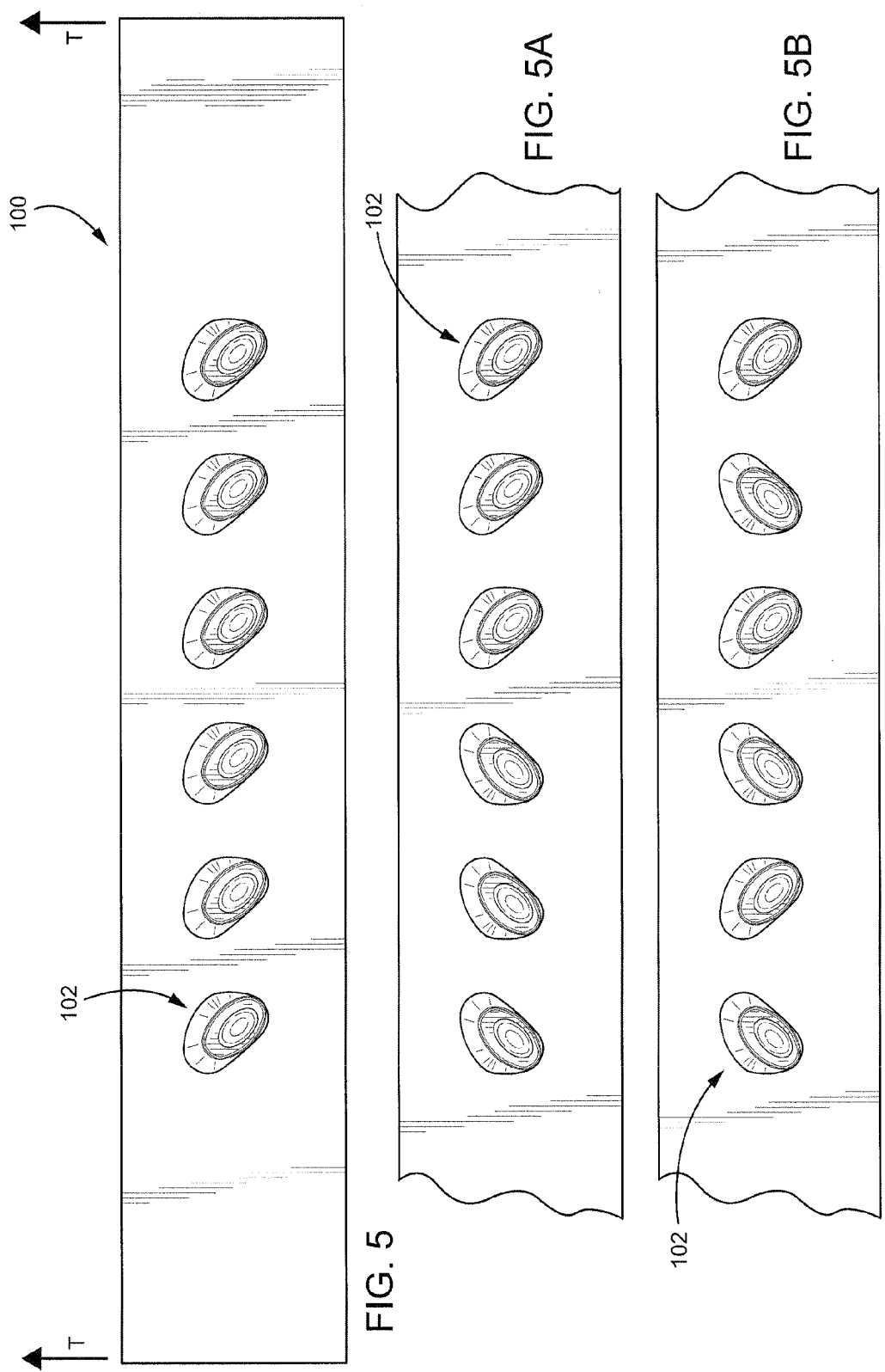

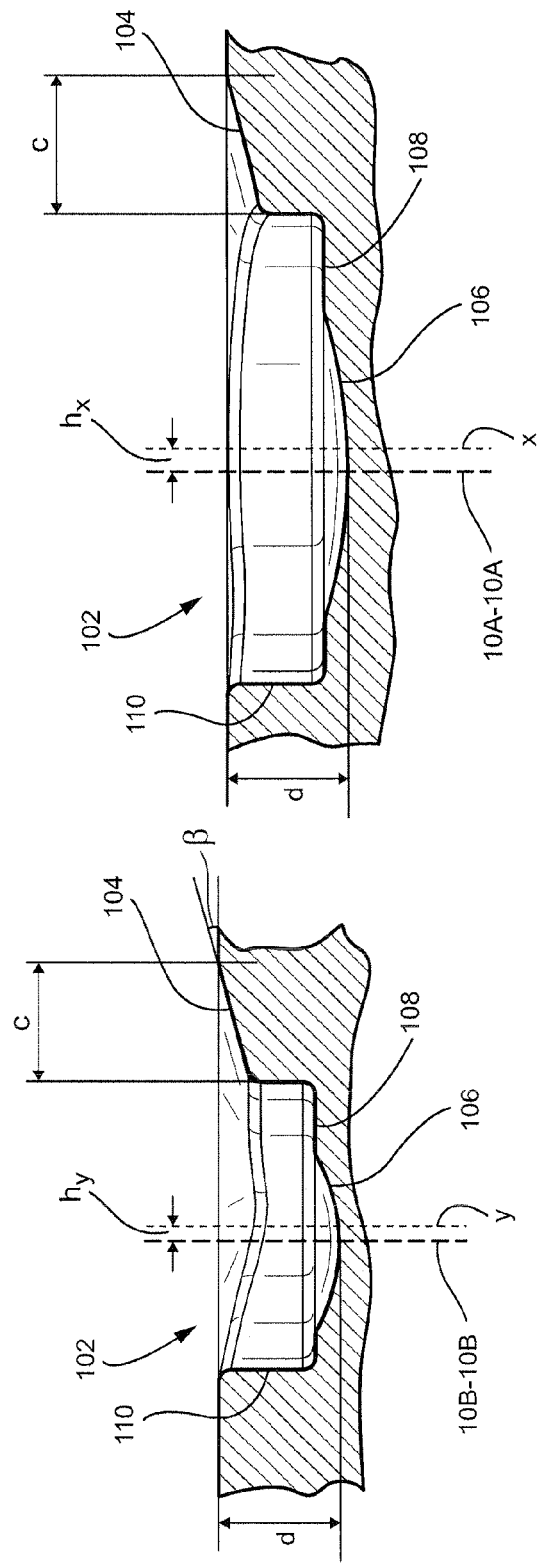
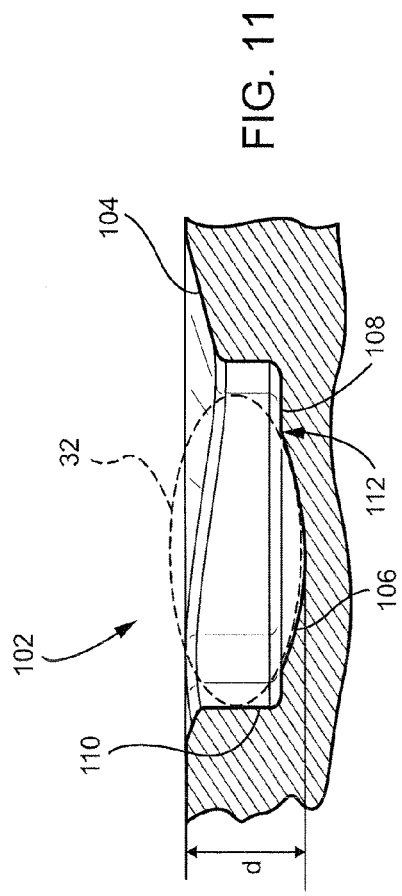

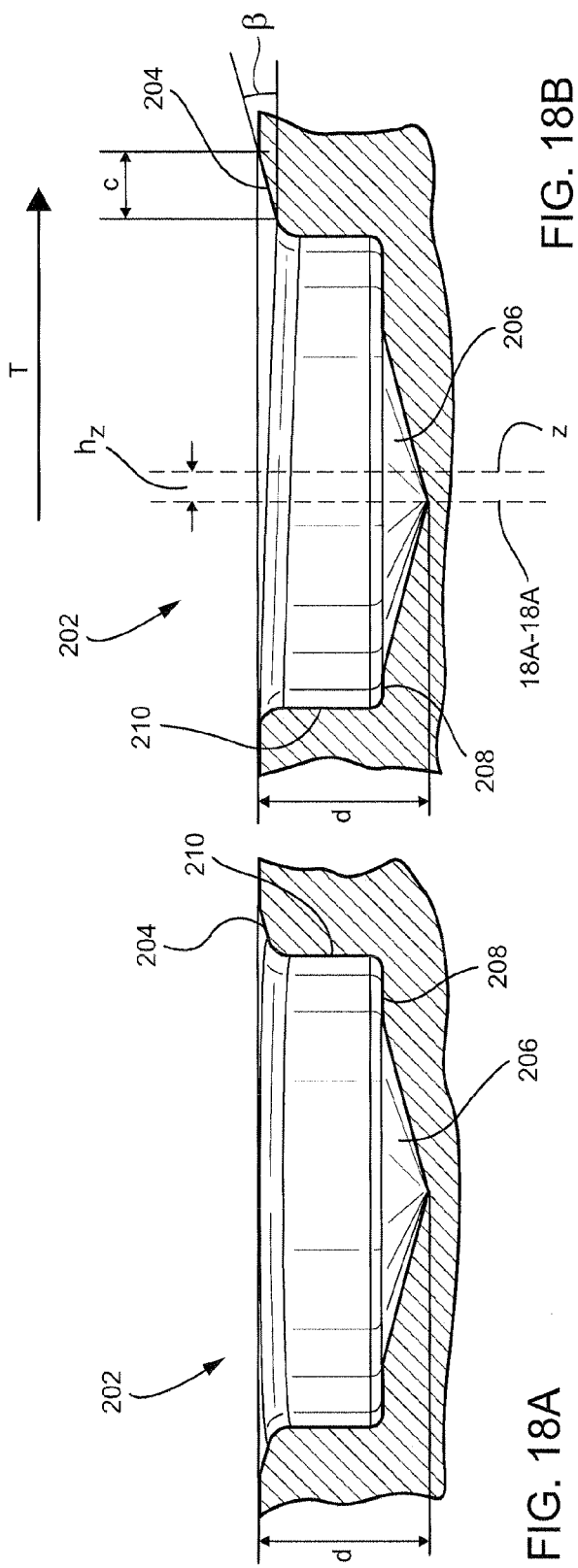
FIG. 18A
FIG. 18B
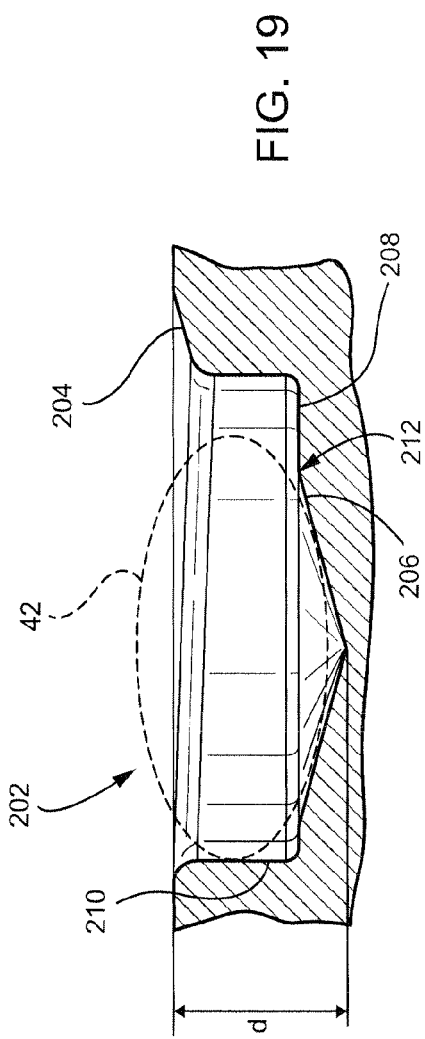
FIG. 19

METHOD AND APPARATUS FOR TRANSPORTING PELLET-SHAPED ARTICLES

CROSS-REFERENCE TO APPLICATION

This application is a continuation-in-part of U.S. Design application No. 29/418,591, filed Apr. 18, 2012, which is incorporated herein by reference in its entirety.

FIELD OF THE TECHNOLOGY

The present technology relates to methods and apparatuses for transporting pellet-shaped articles, e.g., tablets, caplets, lentil-shaped articles, etc.

BACKGROUND OF THE TECHNOLOGY

Processing of pellet-shaped articles (e.g., tablets, caplets, lentil-shaped articles, etc), such as marking the articles with indicia, coloring the articles, laser drilling holes in the articles, coating the articles, and/or inspecting the articles is known in the art. The articles may be transported past one or more processing stations (e.g., printing, inspection, drilling, etc.) by carrier bars provided with one or more article receiving pockets.

In a typical application, the carrier bars are transported along a conveyer. The articles are fed into the pockets on the carrier bar from a hopper. Empty pockets are brought past the hopper for receiving the articles and the pockets are gravity-fed with the articles. The further processing of the articles in the pockets requires that the articles be oriented uniformly and held in position in the pockets during processing. To accomplish this uniform orientation and stable positioning, fairly close tolerances between the articles and the interior of the pockets must be maintained. However, it is these same tolerances that cause difficulty in loading or filling the individual pockets with the individual articles.

Thus, there is a need in the art for an improved method and apparatus for transporting articles that do not suffer from the above-mentioned drawbacks.

SUMMARY OF THE TECHNOLOGY

One aspect of the present technology is to provide a carrier bar that overcomes one or more of the shortcomings of the prior art, e.g., to maintain the article within the pocket in a more consistent and repeatable position for later processing.

Another aspect of the present technology relates to a carrier bar to convey at least one pellet-shaped article (e.g., caplets, tablets, lentil-shaped articles, etc.) along a predetermined conveyer path in a direction of travel. The carrier bar according to an aspect of the present technology includes at least one pocket adapted to receive a pellet-shaped article and each pocket has a pocket wall. The carrier bar according to an aspect of the present technology also includes a product settling area located in the pocket, having a dimple adapted to seat the bottom side of the pellet-shaped article. The dimple may be defined by an edge and may be offset from the center of said product settling area. In an example, the dimple is shaped to position, hold, or bias a portion of the pellet-shaped article towards and/or against a portion of the pocket wall. The dimple may be positioned such that the article is held in an asymmetric position relative to the pocket.

In examples, (a) the dimple may be offset from the center of said product settling area opposite of the direction of travel, (b) a chamfer area may be disposed around the at least one pocket, and/or (c) the pocket, the product settling area, and the dimple may be offset or angled from a transverse axis of the carrier bar.

Another aspect of the present technology relates to a carrier bar to convey at least one pellet-shaped article (e.g., caplets, tablets, lentil-shaped articles, etc.) along a predetermined conveyer path in a direction of travel. The carrier bar according to an aspect of the present technology includes at least one pocket that has at least one pocket axis and each pocket is adapted to receive a pellet-shaped article. Each pocket includes a product settling area located in said at least one pocket and a dimple in the product settling area defined by an edge. Each dimple has at least one dimple axis, and the dimple is adapted to seat a bottom side of the pellet-shaped article. The at least one pocket axis and said at least one dimple axis are offset from one another.

In examples, (a) the dimple axis may be offset with respect to the at least one pocket axis opposite of the direction of travel, (b) a chamfer area may be disposed around the at least one pocket, (c) the depth of said at least one pocket and said at least one product settling area may be dimensioned such that the top side of the pellet-shaped article extends above an upper exterior surface of the carrier bar in use, and/or (d) both pocket and dimple major axes may be parallel to one another and both pocket and dimple minor axes may be parallel to one another, and both pocket and dimple major axes may be offset at an angle from the direction of travel Another aspect of the present technology relates to a method for transporting and processing a pellet-shaped article (e.g., a caplet, a tablet, a lentil-shaped article, etc.). The method includes conveying the pellet-shaped article along a direction of travel such that the pellet-shaped article seats in a dimple offset from a center of said pocket.

In examples, (a) the pellet-shaped article may be offset from the center of the pocket opposite the direction of travel, (b) said dimple may be shaped to position, hold, or bias a portion of said pellet-shaped article towards and/or against a pocket wall disposed about said pocket, (c) the dimple may be positioned in said pocket such that the pellet-shaped article is held in an asymmetric position relative to the pocket and/or (d) the pocket may be angled or offset from a transverse axis of the carrier bar.

Another aspect of the present technology relates to a conveyor apparatus for processing pellet-shaped articles in a conveyor (e.g., a conveyor loop, a conveyor belt, a plurality of carrier bars, and/or a carrier drum). The conveyor apparatus includes a plurality of pockets provided to the conveyor, each pocket adapted to releasably retain a pellet-shaped article. Each pocket includes a pocket wall and a product settling area included in each pocket and has a dimple defined by an edge, said dimple is adapted to seat a bottom side of the pellet-shaped article, wherein said dimple is offset from a center of said product settling area and said dimple is shaped to position, hold, or bias a portion of the pellet-shaped article towards and/or against a portion of the pocket wall.

In examples, (a) the dimple may be positioned such that the pellet-shaped article is held in an asymmetric position relative to the pocket, (b) the dimple may be offset from the center of said product settling area opposite of a direction of travel, (c) a chamfer area may be disposed around the pocket, said chamfer area being defined by a chamfer width and a chamfer angle, wherein the chamfer area extends from the pocket substantially in a direction of travel, (d) the pocket, the product settling area, and the dimple may be offset or angled from a transverse axis of the carrier bar, and/or (e) the pocket may be dimensioned such that at least a portion of a top side of the pellet-shaped article held therein extends above a top surface of the carrier bar.

Other aspects, features, and advantages of this technology will become apparent from the following detailed description when taken in conjunction with the accompanying drawings, which are a part of this disclosure and which illustrate, by way of example, principles of this technology.

BRIEF DESCRIPTION OF THE DRAWINGS

The accompanying drawings facilitate an understanding of the various examples of this technology. In such drawings:

FIG. 5 is a top view of a carrier bar, according to an example of the present technology;

FIG. 5A is a top view of a carrier bar with a variation of the orientation of the pockets, according to an example of the present technology;

FIG. 5B is a top view of a carrier bar with a variation of the orientation of the pockets, according to an example of the present technology;

FIG. 10A is a cross-sectional view through line 10A-10A of FIG. 10;

FIG. 10B is a cross-sectional view through line 10B-10B of FIG. 10;

FIG. 11 is a cross-sectional view through line 11-11 of FIG. 10 with a pellet-shaped article in the pocket;

FIG. 18A is a cross-sectional view through line 18A-18A of FIG. 18;

FIG. 18B is a cross-sectional view through line 18B-18B of FIG. 18; and

FIG. 19 is a cross-sectional view through line 18B-18B of FIG. 18 and with a pellet-shaped article in the pocket.

DETAILED DESCRIPTION OF ILLUSTRATED EXAMPLES

The following description is provided in relation to several examples which may share common characteristics and features. It is to be understood that one or more features of any one example may be combinable with one or more features of the other examples. In addition, any single feature or combination of features in any of the examples may constitute additional examples.

Figure 1:
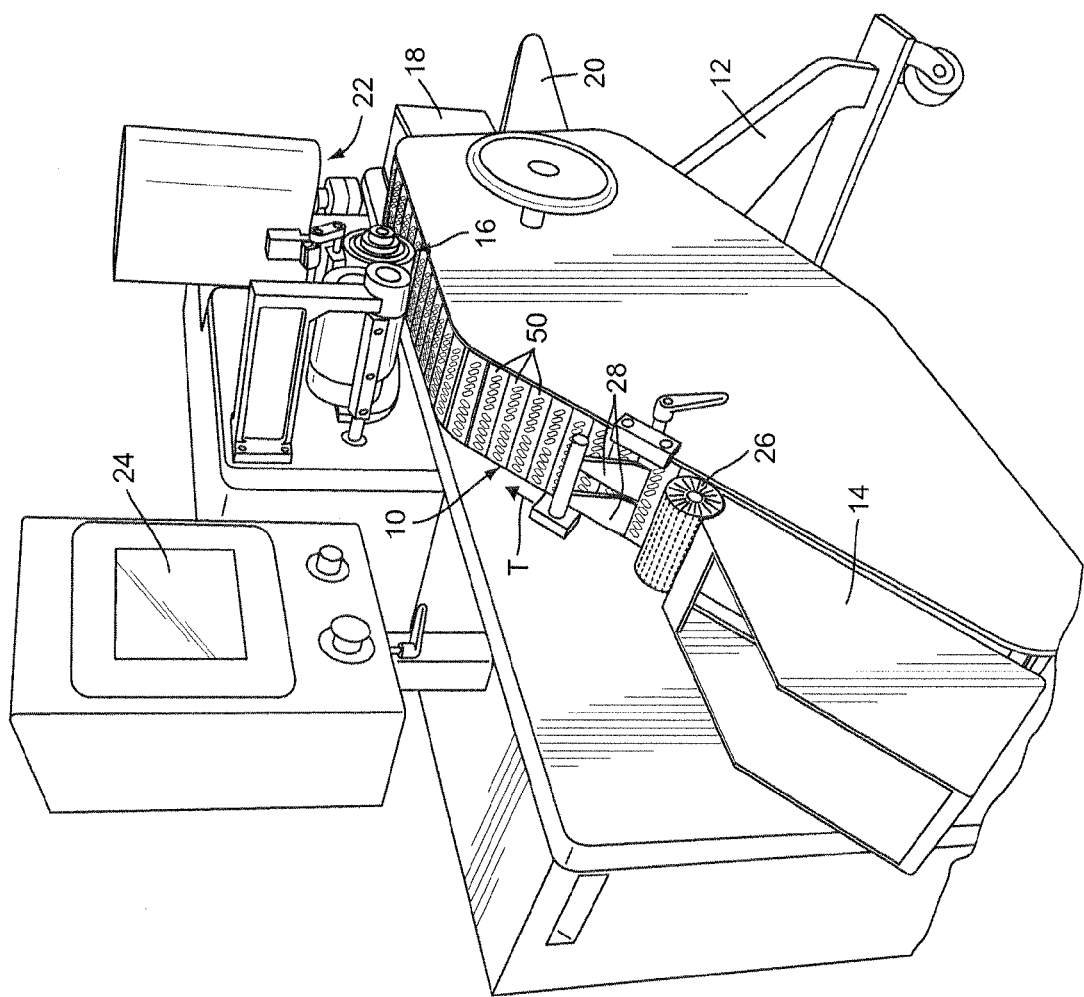
FIG. 1 is a perspective view of a conveyer apparatus for conveying a plurality of pellet-shaped articles according to an example of the present technology.

FIG. 1 illustrates an exemplary conveyer apparatus 10 including a plurality of carrier bars 50 structured to transport or convey a plurality of pellet-shaped articles along a predetermined conveyer path. As described in greater detail below, each carrier bar 50 is structured to receive and positively seat the pellet-shaped articles within respective pockets of the carrier bar in a manner that ensures that a side of each pellet-shaped article is viewable or exposed for processing operations such as marking, drilling, and/or inspecting. The conveyer apparatus 10 drives the carrier bars 50 and the pellet-shaped articles contained therein through a conveyor for processing. Alternatively or additionally, other apparatuses may also be used to convey the pellet-shaped articles, such as a conveyor belt, a conveyor loop, and/or a carrier drum. Examples of such apparatuses may be found in U.S. Pat. No. 8,072,590, which is incorporated herein by reference in its entirety.

As shown in FIG. 1, the conveyer apparatus 10 may be supported upon a frame 12 that is also structured to support a feed hopper 14, a processing station 16 (e.g., printing, marking, drilling, etc.), first and second bins 18, 20 where pellet-shaped articles are collected, and an inspection unit 22 for inspecting the pellet-shaped articles. A display monitor 24 may extend from the frame and displays diagnostic information to an operator.

In this example of the present technology, the feed hopper 14 is disposed over a ramped section of the conveyer apparatus to receive a supply of pellet-shaped articles and deliver the pellet-shaped articles onto the conveyer apparatus. As the conveyer apparatus is drawn beneath the feed hopper 14, the carrier bars 50 will become filled with pellet-shaped articles. Before proceeding from beneath the feed hopper 14, the carrier bars 50 and the pellet-shaped articles will encounter a seating member to assist in seating the pellet-shaped articles within the pockets of the carrier bars. In the illustrated example, the seating member is in the form of a brush 26 that rotates, e.g., in an opposite direction than the direction of transport of the pellet-shaped articles. The brush 26 operates to assist in seating the pellet-shaped articles within the pockets, and operates to return pellet-shaped articles to the feed hopper that have not been received within one of a plurality of pockets provided in the carrier bars. Alternatively or in addition to the brush, the seating member may include one or more fingers provided downstream from the feed hopper to assist in seating the pellet-shaped articles. After the carrier bars pass by the seating member, they pass under one or more blow-back members 28 (e.g., air nozzles) structured to dislodge any articles seated within the pockets of the carrier bars, e.g., when performing diagnostic tests or cleaning the conveyer. Further details of such an arrangement are disclosed in U.S. Pat. No. 7,102,741, which is incorporated herein by reference in its entirety.

Figure 2B:
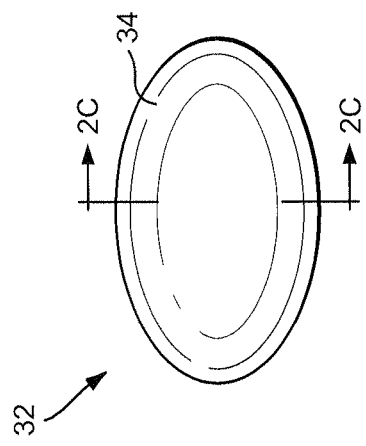
FIG. 2B is a top view of an example of a pellet-shaped article.
Figure 2C:
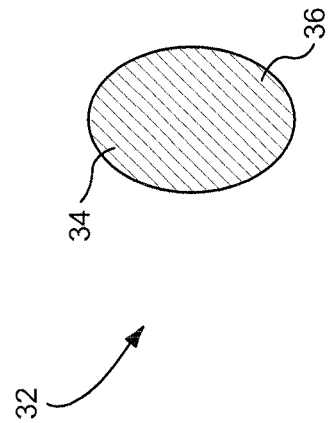
FIG. 2C is a cross-sectional view through line 2C-2C of FIG. 2B.
Figure 2A:
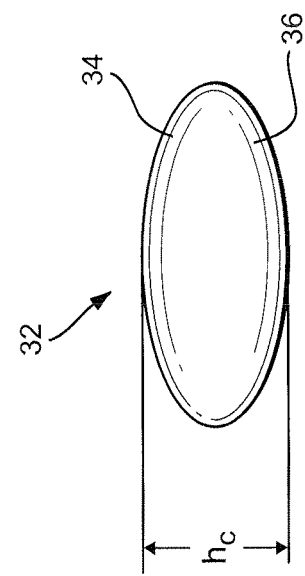
FIG. 2A is a side view of an example of a pellet-shaped article.

FIGS. 2A-2C show an exemplary pellet-shaped article 32. FIG. 2A shows a side view of the pellet-shaped article 32 with a height $h_C$. The pellet-shaped article 32 also has a top side or portion 34 and a bottom side or portion 36. FIG. 2B shows a top view of the pellet-shaped article 32 and the top side 34. FIG. 2C is a cross-sectional view of the pellet-shaped article 32 taken through line 2C-2C of FIG. 2B and shows the top side 34 and the bottom side 36.

Figure 3B:
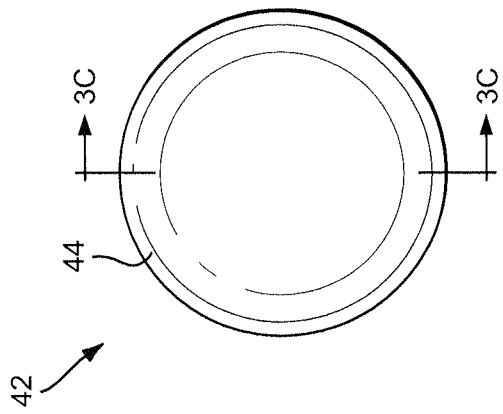
FIG. 3B is a top view of an example of a pellet-shaped article.
Figure 3C:
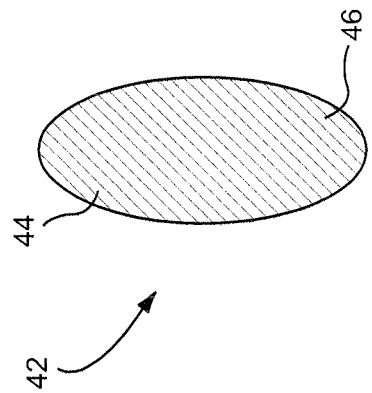
FIG. 3C is a cross-sectional view through line 3C-3C of FIG. 3B.
Figure 3A:
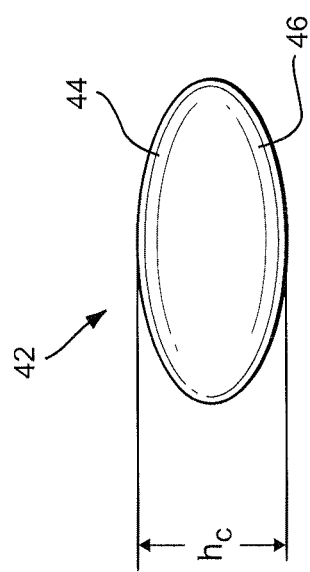
FIG. 3A is a side view of an example of a pellet-shaped article.

FIGS. 3A-3C show an exemplary pellet-shaped article 42. FIG. 3A shows a side view of the pellet-shaped article 42 with a height $h_C$. The pellet-shaped article 42 also has a top side or portion 44 and a bottom side or portion 46. FIG. 3B shows a top view of the pellet-shaped article 42 and the top side 44. FIG. 3C is a cross-sectional view of the pellet-shaped article 42 taken through line 3C-3C of FIG. 3B and shows the top side 44 and the bottom side 46.

Figure 4:
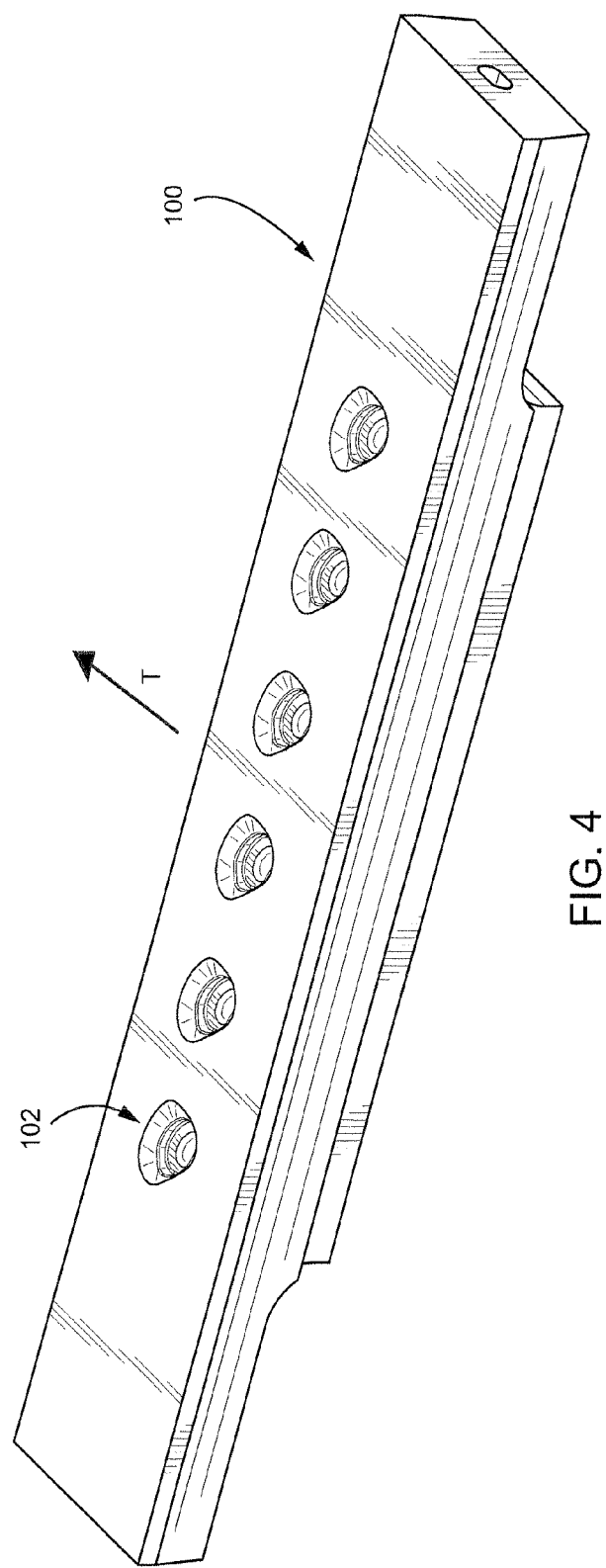
FIG. 4 is a perspective view of a carrier bar having a plurality of pockets, according to an example of the present technology.

FIG. 4 shows a carrier bar 100, according to an example of the present technology, in perspective view. The carrier bar 100 includes a plurality of pockets 102 and travels in direction T.

FIG. 5 shows a top view of the carrier bar 100 and pockets 102. Arrows T indicate the direction of travel.

Figure 5C:
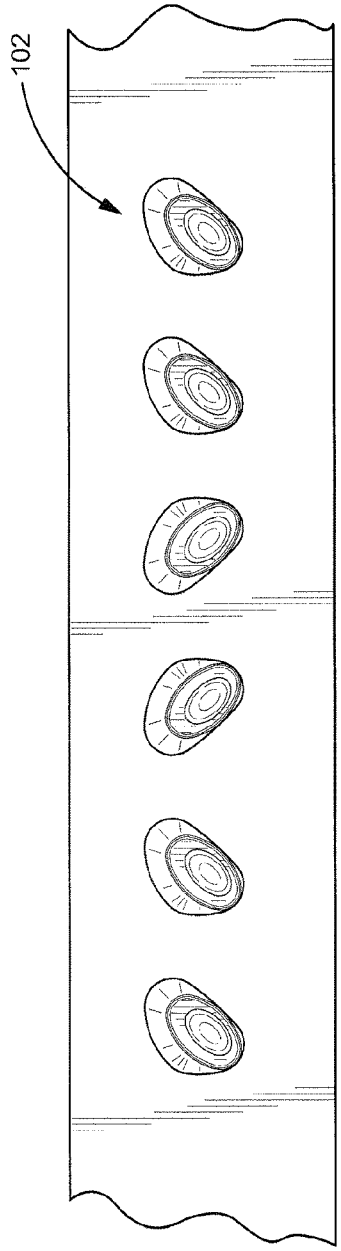
FIG. 5C is a top view of a carrier bar with a variation of the orientation of the pockets, according to an example of the present technology.

FIGS. 5A-5C are further top views of the carrier bar 100 and pockets 102. FIG. 5A shows two groups of pockets 102, with one group of pockets being oriented in one direction and another group of pockets oriented in another direction, or in mirror image. FIG. 5B shows pockets 102 oriented in different directions in an alternating pattern. FIG. 5C shows multiple groups of pockets 102 where the orientation of each group of pockets alternates.

Figure 6:
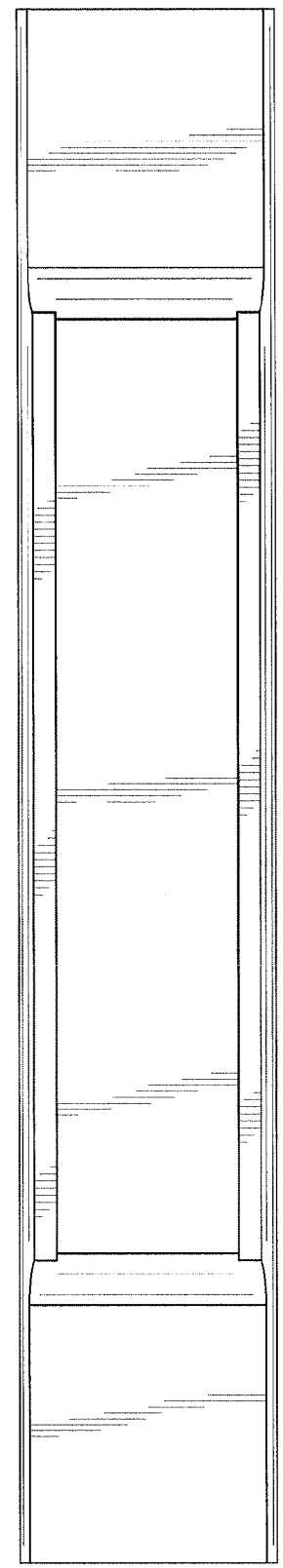
FIG. 6 is a bottom view of a carrier bar, according to an example of the present technology.
Figure 7:
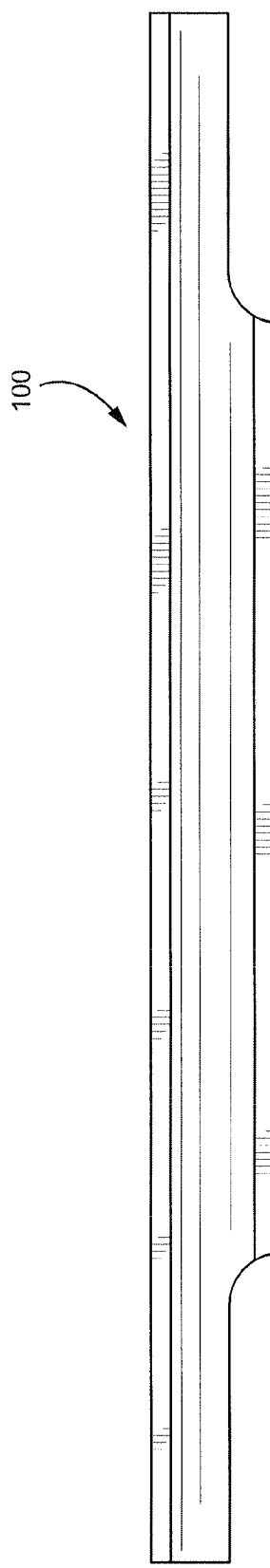
FIG. 7 is a front view of a carrier bar, according to an example of the present technology.
Figure 8:
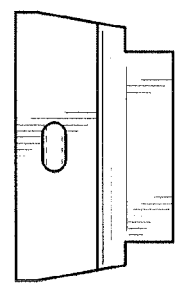
FIG. 8 is a side view of a carrier bar, according to an example of the present technology.

FIG. 6 shows a bottom view of the carrier bar 100. FIG. 7 shows a side view of the carrier bar 100. FIG. 8 shows a side or end view of the carrier bar 100.

Figure 9:
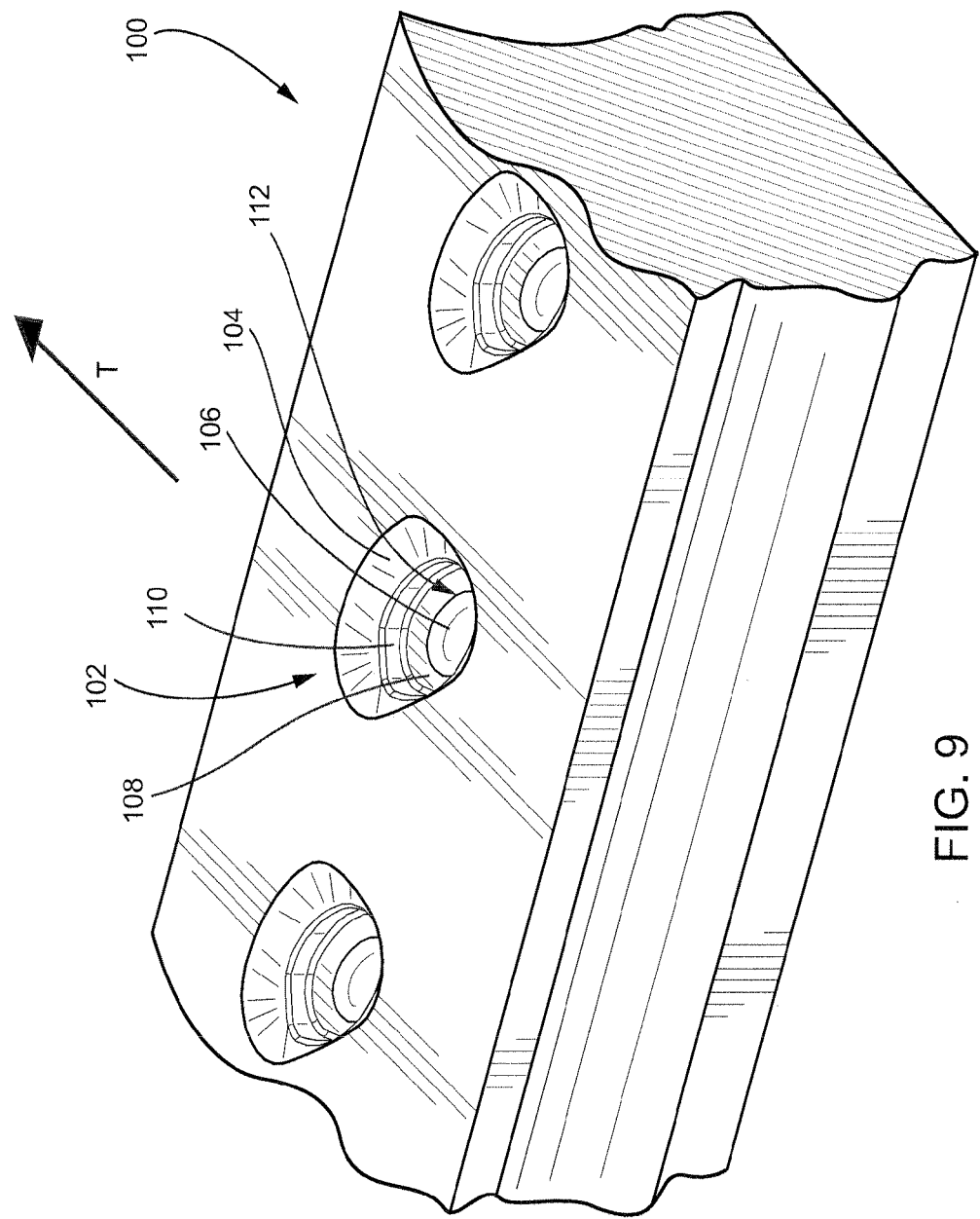
FIG. 9 is an enlarged perspective view of the pockets of a carrier bar, according to an example of the present technology.

FIG. 9 shows a detailed perspective view of a pocket 102 on the carrier bar 100, according to an example of the present technology. While this view shows the pocket 102 disposed in a carrier bar, it is also to be understood that such a pocket may be located on or provided to any conveyor, e.g., a conveyor loop, a conveyor belt, and/or a carrier drum, etc. Disposed around the pocket 102 is a chamfer area 104. The chamfer area 104 provides a sloped path into the pocket 102 and helps direct a pellet-shaped article into the pocket. A pocket wall 110 defines an interior perimeter of the pocket 102. In the pocket 102 there is a product settling area 108 and a dimple 106 within the product settling area. The product settling area 108 may essentially be a bottom surface of the pocket and the dimple 106 in the product settling area is shaped to position, hold, or bias a portion of the pellet-shaped article towards and/or against a portion of the pocket wall 110. The dimple 106 may be defined in the product settling area 108 by an edge 112. In summary, as pellet-shaped articles are fed into the carrier bars 100 as shown in FIG. 1, for example, the chamfer area 104 directs individual pellet-shaped articles into individual pockets 102, then the pellet-shaped article may seat in the dimple 106 in the product settling area 108 and a portion of the pellet-shaped article is held against the pocket wall 110. The edge 112 that defines the dimple 106 allows for more consistent seating of the pellet-shaped article within the pocket 102 and against the pocket wall 110.

Figure 10:
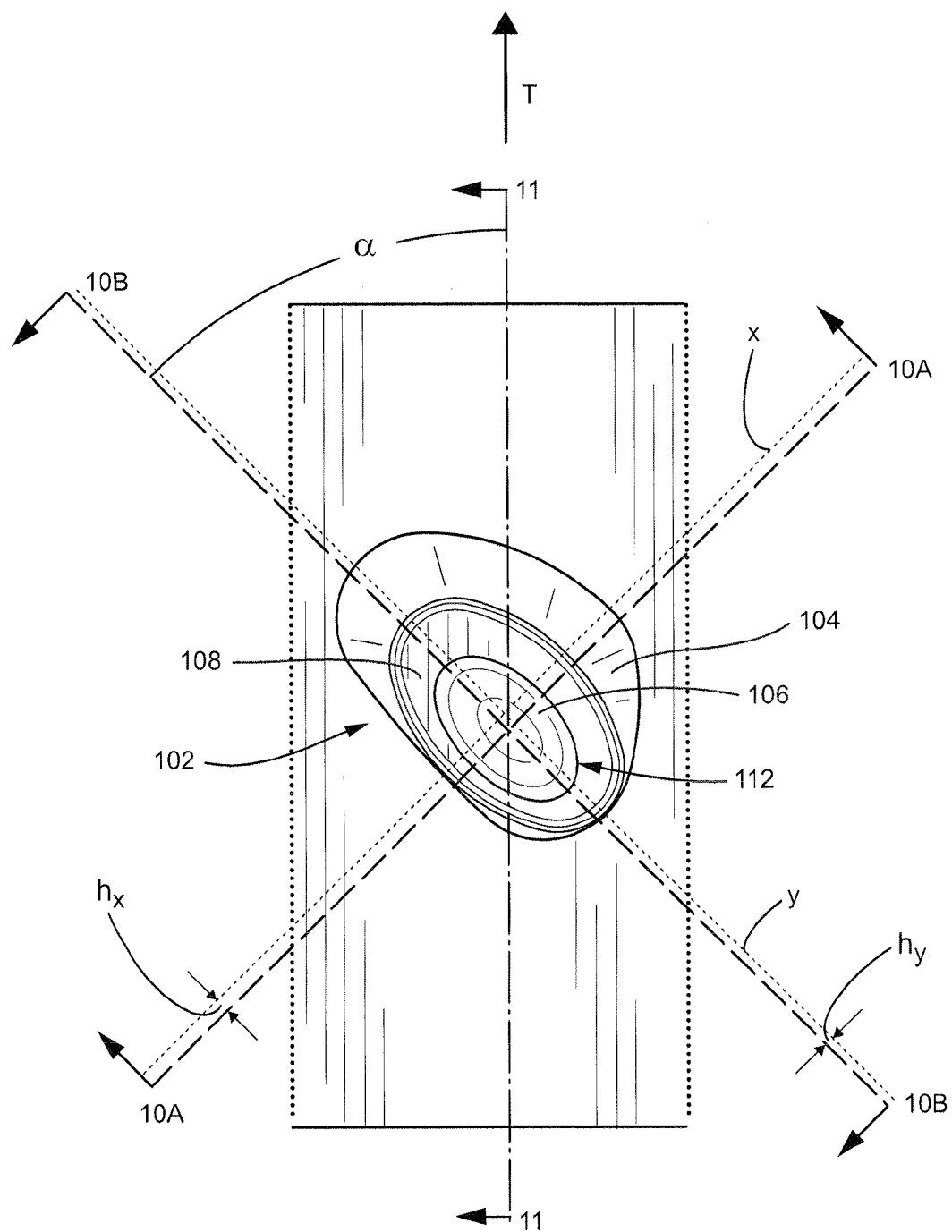
FIG. 10 is an enlarged top view of a pocket of a carrier bar, according to an example of the present technology.

FIG. 10 shows a detailed top view of a pocket 102, according to an example of the present technology. The chamfer area 104 is disposed around the pocket 102 substantially in the direction of travel T of the carrier bar 100, such that the chamfer area may serve to guide a pellet-shaped article into the pocket. The pocket 102 in this view may be defined by two axes, x and y. The y-axis is a major axis that bisects the pocket longitudinally. The x-axis is oriented perpendicularly to the y-axis and also bisects the pocket perpendicular to the y-axis. At the bottom of the product settling area 108 is a dimple 106 defined therein by the edge 112. The dimple may also be defined by two axes shown as lines 10A-10A and 10B-10B. Axis 10B-10B bisects the dimple 106 longitudinally and is parallel to the major axis y of the pocket 102. Axis 10A-10A bisects the dimple 106 perpendicularly to axis 10B-10B and is parallel to the pocket minor axis x.

Also, shown in this exemplary view is the dimple 106 being offset with respect to the pocket 102. In this view, the dimple 106 is offset along both axes, however it should be understood that the dimple can be offset within the pocket 102 along only one or the other axis. In this view, the pocket minor axis x and dimple minor axis 10A-10A are offset from one another by a distance $h_x$. Also, the pocket major axis y and the dimple major axis 10B-B are offset from one another by a distance $h_y$. The pocket 102 is shown angled or offset from the direction of travel T or transverse axis of the carrier bar 100 by an angle α. By offsetting the dimple 106 within the pocket 102 along both axes and angling the pocket with respect to the direction of travel a pellet-shaped article 32, when seated therein, will be positioned, held, or biased towards and/or against the pocket wall 110, as best shown in FIG. 11.

FIG. 10A shows a cross-sectional view of the pocket 102 taken through line 10A-10A of FIG. 10. In this view, it can again be seen how the major axes are offset from one another. The dimple major axis 10B-10B is offset from the pocket major axis y by a distance of $h_y$. The dimple 106 is shown as concave and crowned but may also be any other suitable shape, e.g. conical. Shown also in this view is a chamfer width c of the chamfer area 104 that may be variable about the pocket 102 as can be seen in FIG. 10. The chamfer area 104 may also have a chamfer angle β that defines the slope of the chamfer into the pocket and the chamfer angle may too be variable about the pocket 102, or it may be constant.

FIG. 10B shows another cross-sectional view of the pocket 102 taken through line 10B-10B of FIG. 10. In this view, it can again be seen how the minor axes are offset from one another. The dimple minor axis 10A-10A is offset from the pocket minor axis x by a distance of $h_x$. The chamfer width c is shown slightly wider than in FIG. 10A, thus depicting its variability about the pocket 102.

FIG. 11 shows another cross-sectional view of the pocket 102 taken through line 11-11 of FIG. 10. Line 11-11 is parallel to the direction of travel T such that FIG. 11 shows a cross-section of the pocket perpendicular to the direction of travel. In this view a pellet-shaped article 32 is also shown in phantom to demonstrate how it may seat within the pocket 102. The dimple 106 may be profiled to conform substantially to a portion of the pellet-shaped article 32. Also, the depth d of the pocket, i.e. the distance from a top surface of the carrier bar 100 to the lowest point of the dimple 106 may be dimensioned such that when a pellet-shaped article 32 is seated therein, a portion of the pellet-shaped article may extend above the top surface of the carrier bar (i.e. $h_c$ is greater than d). Such an arrangement is particularly suited for carrying out contact-type processing, e.g., contact printing. However, it should also be noted that for certain processing methods (e.g., non-contact processing, including ink-jet printing, laser drilling, laser printing, inspection, etc.) the top portion of the pellet-shaped article 34 may be flush or below the top surface of the carrier bar. The pocket depth d would then be equal to or greater than $h_c$, respectively. It is also contemplated, however, that the pellet-shaped article 32 may extend above the top surface of the carrier bar 100 for the aforementioned non-contact processing methods. It is further contemplated that contact-type processing methods may be performed on the pellet-shaped article 32 when it is flush with or below the top surface of the carrier bar 100. Also exemplified in this view is the pellet-shaped article 32 being positioned, held, or biased towards and/or against the pocket wall 110. When seated in the dimple 106 in this manner, the pellet-shaped article 32 will be held in an asymmetric position relative to the pocket 102.

Figure 12:
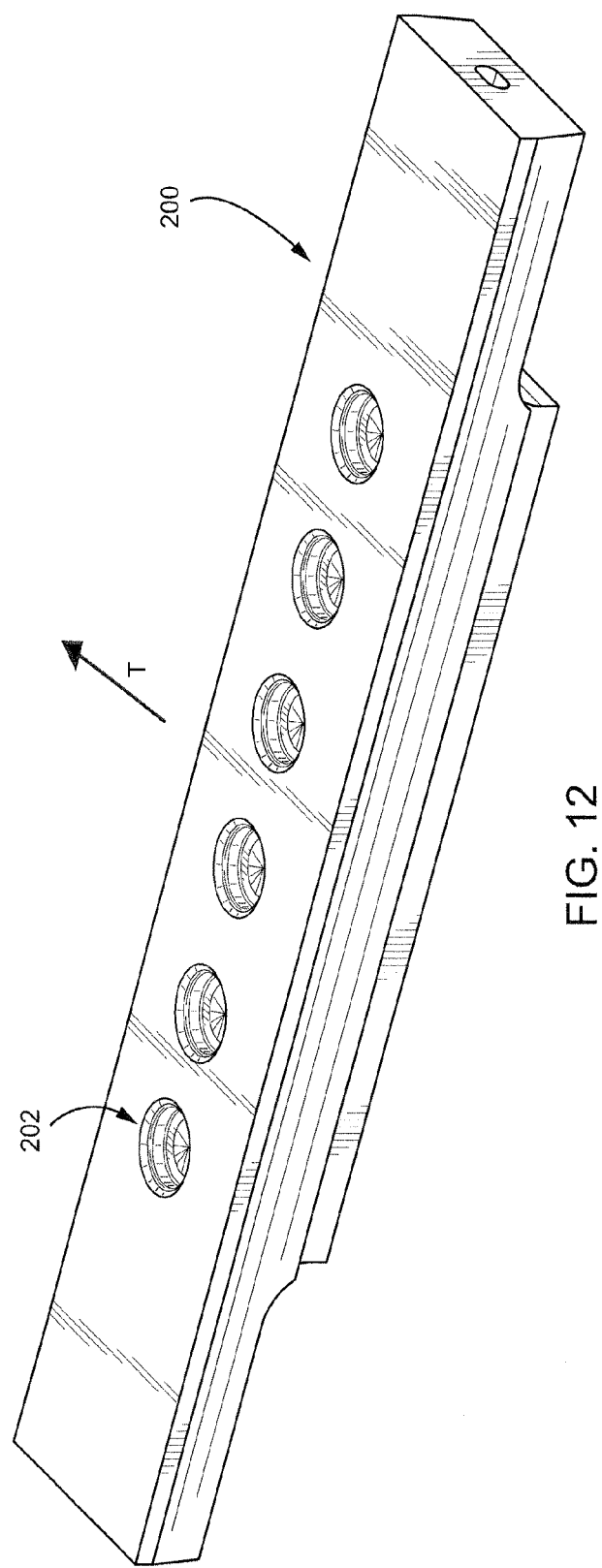
FIG. 12 is a perspective view of a carrier bar, according to another example of the present technology.

FIG. 12 shows another exemplary carrier bar 200 according to an example of the present technology in perspective view. The carrier bar 200 includes a plurality of pockets 202 and travels in direction T.

Figure 13:
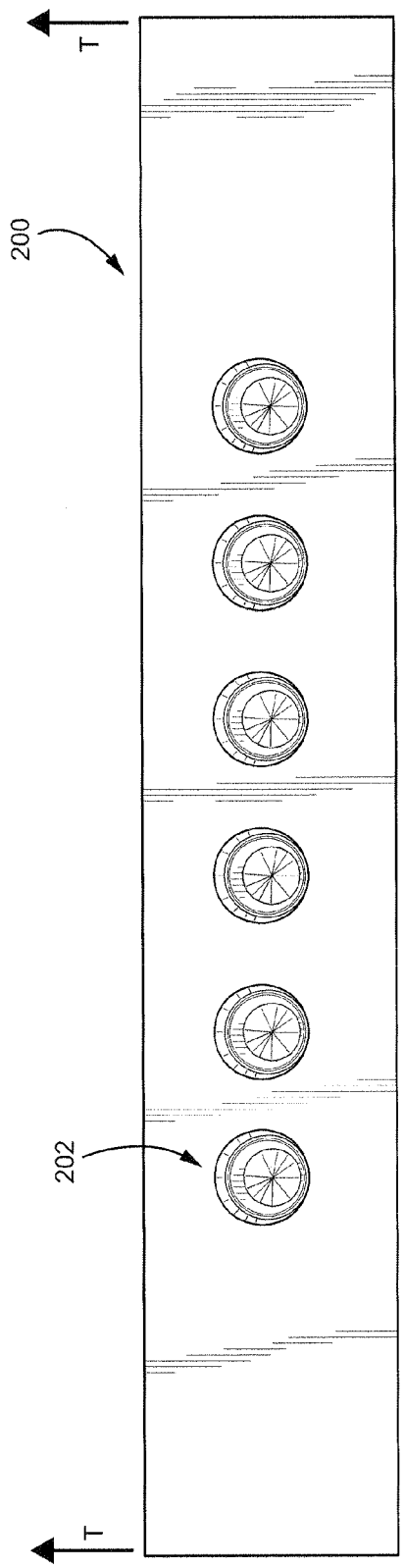
FIG. 13 is a top view of a carrier bar, according to an example of the present technology.

FIG. 13 shows a top view of the carrier bar 200 and pockets 202. Arrows T indicate the direction of travel.

Figure 14:
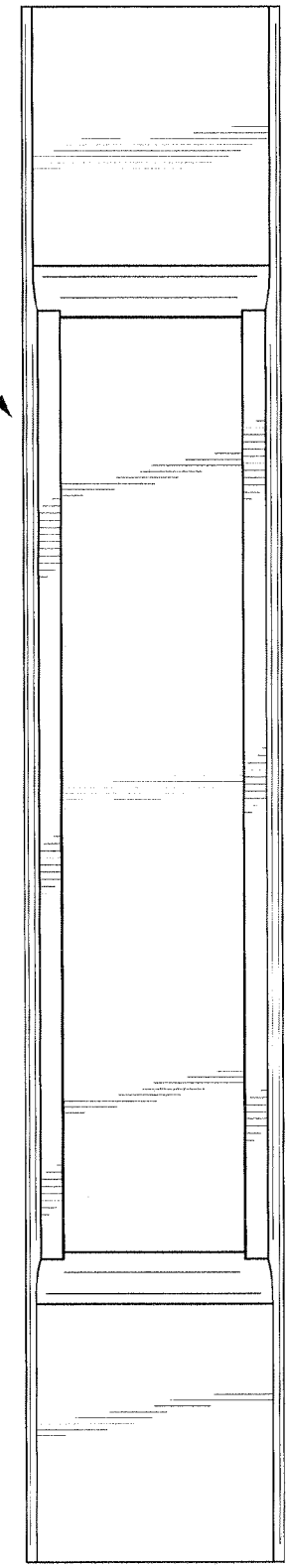
FIG. 14 is a bottom view of a carrier bar, according to an example of the present technology.
Figure 15:
FIG. 15 is a front view of a carrier bar, according to an example of the present technology.
Figure 16:
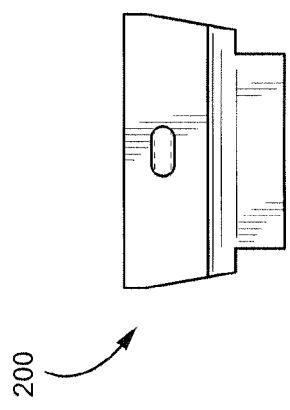
FIG. 16 is a side view of a carrier bar, according to an example of the present technology.

FIG. 14 shows a bottom view of the carrier bar 200. FIG. 15 shows a side view of the carrier bar 200. FIG. 16 shows a side or end view of the carrier bar 200.

Figure 17:
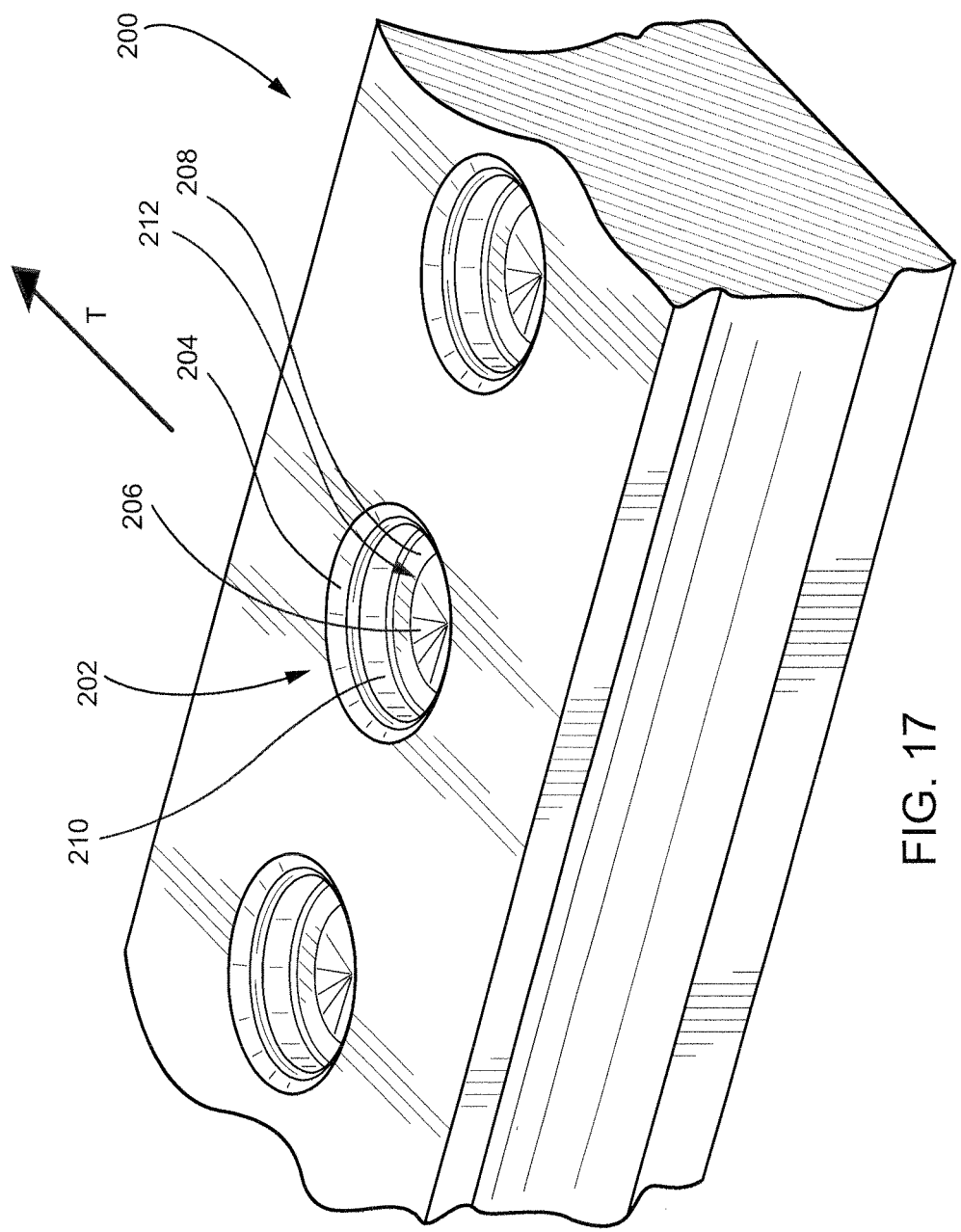
FIG. 17 is a detailed perspective view of the pockets of a carrier bar, according to an example of the present technology.

FIG. 17 shows a detailed perspective view of a pocket 202 on the carrier bar 200, according to an example of the present technology. While this view shows the pocket 202 disposed in a carrier bar, it is also understood that such a pocket may be located on or provided to any conveyor, e.g., a conveyor loop, a conveyor belt, and/or a carrier drum, etc. Disposed around the pocket 202 is a chamfer area 204. The chamfer area 204 provides a sloped path into the pocket 202 and helps direct a pellet-shaped article into the pocket. A pocket wall 210 defines an interior perimeter of the pocket 202. In the pocket 202 there is a product settling area 208 and a dimple 206 within the product settling area. The product settling area 208 may essentially be a bottom surface of the pocket and the dimple 206 in the product settling area is shaped to position, hold, or bias a portion of the pellet-shaped article towards and/or against a portion of the pocket wall 210. The dimple 206 may be defined in the product settling area 208 by an edge 212. The edge 212 may be asymmetric to the pocket wall 210. In summary, as pellet-shaped articles are fed into the carrier bars 200 as shown in FIG. 1, for example, the chamfer area 204 directs individual pellet-shaped articles into individual pockets 202, then the pellet-shaped article may seat in the dimple 206 in the product settling area 208 and a portion of the pellet-shaped article is held against the pocket wall 210. The edge 212 that defines the dimple 206 allows for more consistent seating of the pellet-shaped article within the pocket 202 and against the pocket wall 210.

Figure 18:
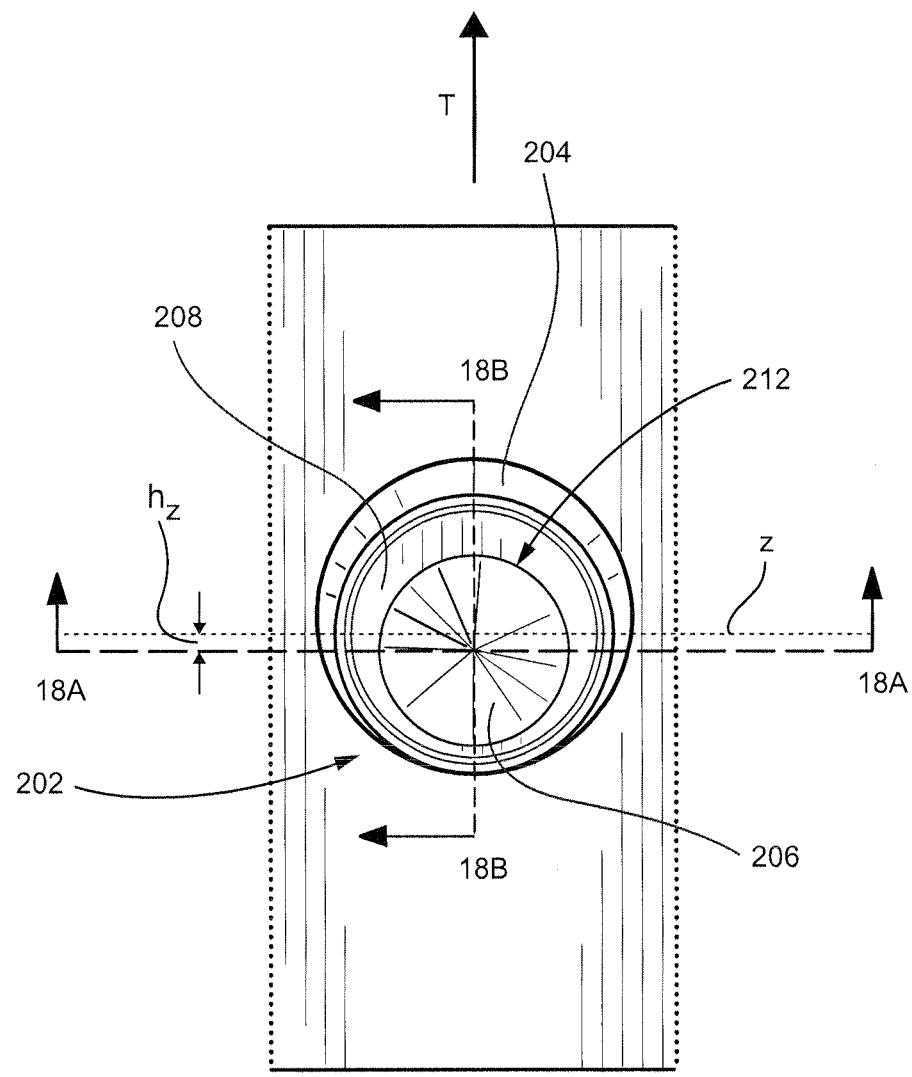
FIG. 18 is a detailed top view of a pocket of a carrier bar, according to an example of the present technology.

FIG. 18 shows a detailed top view of a pocket 202, according to this example of the present technology. The chamfer area 204 is disposed around the pocket 202 substantially in the direction of travel T of the carrier bar 200, such that the chamfer area may serve to guide a pellet-shaped article into the pocket. The pocket 202 in this example may be defined by two axes. Line 18B-18B bisects the pocket 202 in the direction of travel T. The z-axis bisects pocket 202 perpendicular to line 18B-18B. The dimple 206 may also be defined by two axes. Line 18B-18B bisects the dimple in the direction of travel T. Line 18A-18A bisects the dimple 206 perpendicularly to line 18B-18B and in the direction of travel T.

Also, shown in this exemplary view is the dimple 206 being offset with respect to the pocket 202. The dimple's axis 18A-18A is offset from the z-axis of the pocket along and opposite the direction of travel T. The offset distance is $h_z$. By offsetting the dimple 206 within the pocket 202 along and opposite the direction of travel T a pellet-shaped article 42, when seated therein, will be positioned, held, or biased towards and/or against the pocket wall 210, as best shown in FIG. 19.

FIG. 18A shows a cross-sectional view of the pocket 202 taken through line 18A-18A of FIG. 18. The dimple 206 is shown as concave and conical but may also be any other suitable shape, e.g. crowned.

FIG. 18B shows another cross-sectional view of the pocket 202 taken through line 18B-18B of FIG. 18. In this view, it can again be seen how the axes perpendicular to the direction of travel are offset from one another. The dimple axis 18A-18A is offset from the pocket axis z by a distance of $h_z$. Shown also in this view is a chamfer width c of the chamfer area 104 that may be variable about the pocket 102, as can be seen in FIG. 18. The chamfer width c may decrease radially from an axis bisecting the pocket 102 in the direction of travel T. The chamfer area 204 may also have a chamfer angle β that defines the slope of the chamfer into the pocket and the chamfer angle may too be variable about the pocket 202, or it may be constant.

FIG. 19 shows another cross-sectional view of the pocket 202 taken through line 18B-18B of FIG. 18. In this view a pellet-shaped article 42 is also shown in phantom to demonstrate how it may seat within the pocket 202. The dimple 206 may be profiled to conform substantially to a portion of the pellet-shaped article 42, however in this view the pellet-shaped article is rounded and the dimple is shaped conically. Also, the depth of the pocket d, i.e. the distance from a top surface of the carrier bar 200 to the lowest point of the dimple 206 may be dimensioned such that when a pellet-shaped article 42 is seated therein a portion of the pellet-shaped article may extend above the top surface of the carrier bar (i.e. $h_c$ is greater than d). Such an arrangement is particularly suited for carrying out contact-type processing, e.g., contact printing. However, it should also be noted that for certain processing methods (e.g., non-contact processing, including ink-jet printing, laser drilling, laser printing, inspection, etc.) the top portion of the pellet-shaped article 44 may be flush or below the top surface of the carrier bar. The pocket depth d would then be equal to or greater than $h_C$, respectively. It is also contemplated, however, that the pellet-shaped article 42 may extend above the top surface of the carrier bar 200 for the aforementioned non-contact processing methods. It is further contemplated that contact-type processing methods may be performed on the pellet-shaped article 42 when it is flush with or below the top surface of the carrier bar 200. Also, exemplified in this view is the pellet-shaped article 42 being positioned, held, or biased towards and/or against the pocket wall 210. When seated in the dimple 206 in this manner, the pellet-shaped article 42 will be held in an asymmetric position relative to the pocket 202.

While the technology has been described in connection with what are presently considered to be the most practical and preferred examples, it is to be understood that the technology is not to be limited to the disclosed examples, but on the contrary, is intended to cover various modifications and equivalent arrangements included within the spirit and scope of the technology. Also, the various examples described above may be implemented in conjunction with other examples, e.g., aspects of one example may be combined with aspects of another example to realize yet other examples. Further, each independent feature or component of any given assembly may constitute an additional example.

What is claimed is:

1. A carrier bar to convey at least one pellet-shaped article along a predetermined conveyer path in a direction of travel, the carrier bar comprising:
   at least one pocket adapted to receive a pellet-shaped article and each pocket having a pocket wall; and
   a product settling area included in each pocket and having a dimple defined by an edge, said dimple adapted to seat a bottom side of the pellet-shaped article,
   wherein said dimple is offset from a center of said product settling area and said dimple is shaped to position, hold, or bias a portion of the pellet-shaped article towards and/or against a portion of the pocket wall, and
   wherein the dimple is separated around its entire perimeter from the pocket wall by a surface of the product settling area.

2. The carrier bar of claim 1, wherein the dimple is positioned such that the pellet-shaped article is held in an asymmetric position relative to the pocket.

3. The carrier bar of claim 1, wherein said dimple is offset from the center of said product settling area opposite of the direction of travel.

4. The carrier bar of claim 1, said at least one pocket comprising:
   a chamfer area disposed around the at least one pocket, said chamfer area being defined by a chamfer width and a chamfer angle, wherein the chamfer area extends from the pocket substantially in the direction of travel.

5. The carrier bar of claim 4, wherein said chamfer angle is radially variable from an axis bisecting said at least one pocket in a direction of travel.

6. The carrier bar of claim 4, said chamfer angle is constant about said at least one pocket.

7. The carrier bar of claim 4, wherein the chamfer width of said chamfer area is variable about the pocket.

8. The carrier bar of claim 7, wherein said chamfer width decreases radially from an axis bisecting said at least one pocket in a direction of travel.

9. The carrier bar of claim 1, wherein said dimple is crowned or conical in shape.

10. The carrier bar of claim 1, wherein said pellet-shaped article, said pocket, said product settling area, and said dimple have a similar shape when viewed from above.

11. The carrier bar of claim 1, wherein said pellet-shaped article is lentil-shaped.

12. The carrier bar of claim 1, wherein said pocket, said product settling area, and said dimple are offset or angled from a transverse axis of the carrier bar.

13. The carrier bar of claim 1, wherein said pocket is dimensioned such that at least a portion of a top side of the pellet-shaped article held therein extends above a top surface of the carrier bar.

14. The carrier bar of claim 1, wherein a depth of said pocket is dimensioned to be greater than, less than, or equal to a height of the pellet-shaped article.

15. The carrier bar of claim 1, wherein the pockets are oriented or angled in the same direction along a length of the carrier bar.

16. The carrier bar of claim 15, wherein the pockets are oriented in mirror image about a center axis of the carrier bar.

17. The carrier bar of claim 16, wherein a plurality of pockets are oriented in one direction on one side of the center axis and a plurality of pockets are oriented in the opposite direction on the other side of the center axis.

18. A conveyor apparatus to transport pellet-shaped articles for processing, the conveyor apparatus comprising:
   at least one carrier bar of claim 1 provided to a conveyor loop;
   at least one processing station;
   at least one feed hopper; and
   at least one bin adapted to receive the pellet-shaped articles after processing.

19. A carrier bar to convey at least one pellet-shaped article along a predetermined conveyer path in a direction of travel, the carrier bar comprising:
   at least one pocket having at least one pocket axis and each pocket is adapted to receive a pellet-shaped article; and
   a product settling area included in each one pocket and having a dimple defined by an edge, said dimple adapted to seat a bottom side of the pellet-shaped article and having at least one dimple axis, wherein said at least one pocket axis and said at least one dimple axis are offset from one another.

20. The carrier bar of claim 19, wherein the dimple is positioned in the product settling area such that the pellet-shaped article is held in an asymmetric position relative to the pocket.

21. The carrier bar of claim 19, wherein said at least one pocket axis bisects said at least one pocket in a direction perpendicular to the direction of travel and said at least one dimple axis bisects said dimple perpendicular to the direction of travel and said at least one pocket axis is offset from said at least one dimple axis in the direction of travel.

22. The carrier bar of claim 21, wherein said at least one dimple axis is offset with respect to the at least one pocket axis opposite of the direction of travel.

23. The carrier bar of claim 19, wherein said at least one pocket comprises a chamfer area disposed around the at least one pocket, said chamfer area being defined by a chamfer width and a chamfer angle, wherein the chamfer area extends from the pocket substantially in the direction of travel.

24. The carrier bar of claim 23, wherein said chamfer angle is radially variable from an axis bisecting said at least one pocket in a direction of travel.

25. The carrier bar of claim 23, said chamfer angle is constant about said at least one pocket.

26. The carrier bar of claim 23, wherein the chamfer width of said chamfer area is variable about the pocket.

27. The carrier bar of claim 26, wherein said chamfer width decreases radially from an axis bisecting said at least one pocket in a direction of travel.

28. The carrier bar of claim 19, wherein said dimple is crowned or conical in shape.

29. The carrier bar of claim 19, wherein a depth of said at least one pocket and said product settling area is dimensioned such that a top side of the pellet-shaped article extends above an upper exterior surface of the carrier bar in use.

30. The carrier bar of claim 19, wherein a depth of said at least one pocket is dimensioned to be greater than, less than, or equal to a height of the pellet-shaped article.

31. The carrier bar of claim 19, wherein a perimeter of each of said at least one pocket, said product settling area, and said pellet-shaped article are substantially identical in shape.

32. The carrier bar of claim 19, wherein said at least one pocket axis further comprises a pocket major axis and a pocket minor axis, said pocket major axis bisecting said at least one pocket and said pocket minor axis oriented perpendicularly to said pocket major axis, and wherein said at least one dimple axis further comprises a dimple major axis and a dimple minor axis, said dimple major axis bisecting said at least one dimple and said dimple minor axis oriented perpendicularly to said dimple major axis.

33. The carrier bar of claim 32, wherein both major axes are parallel to one another and both minor axes are parallel to one another, and wherein at least one of the dimple major axis and the dimple minor axis is offset from a corresponding one of the pocket major axis and the pocket minor axis.

34. The carrier bar of claim 33, wherein each dimple axis is offset from each corresponding pocket axis.

35. The carrier bar of claim 34, wherein said pocket major axis bisects said at least one pocket longitudinally and said dimple major axis bisects said product settling area longitudinally.

36. The carrier bar of claim 35, wherein both major axes are offset at an angle from the direction of travel.

37. The carrier bar of claim 36, wherein said at least one pocket comprises a chamfer area disposed around the at least one pocket.

38. The carrier bar of claim 37, wherein said chamfer area extends substantially along the pocket major axis in a direction opposite of the offset of the dimple minor axis from the pocket minor axis, and wherein said chamfer area extends substantially along the pocket minor axis in a direction opposite of the offset of the dimple major axis from the pocket major axis.

39. The carrier bar of claim 38, wherein the pockets are oriented or angled in the same direction along a length of the carrier bar.

40. The carrier bar of claim 38, wherein the pockets are oriented in mirror image about a center axis of the carrier bar.

41. The carrier bar of claim 40, wherein a plurality of pockets are oriented in one direction on one side of the center axis and a plurality of pockets are oriented in the opposite direction on the other side of the center axis.

42. A conveyor apparatus to transport pellet-shaped articles for processing, the conveyor apparatus comprising:
at least one carrier bar of claim 19 provided to a conveyor loop;
at least one processing station;
at least one feed hopper; and
at least one bin adapted to receive the pellet-shaped articles after processing.

43. The carrier bar of claim 19, wherein said pellet-shaped articles are further lentil-shaped.

44. A method for transporting and processing a pellet-shaped article, the method comprising:
conveying the pellet-shaped article within a pocket of a carrier bar along a direction of travel such that the pellet-shaped article seats in a dimple offset from a center of said pocket,
wherein said dimple has a dimple axis and the pocket has a pocket axis, said pocket axis and said dimple axis being offset from one another.

45. The method of claim 44, wherein said dimple is shaped to position, hold, or bias a portion of said pellet-shaped article towards and/or against a pocket wall disposed about said pocket.

46. The method of claim 44, wherein the dimple is positioned in said pocket such that the pellet-shaped article is held in an asymmetric position relative to the pocket.

47. The method of claim 44, wherein the pellet-shaped article is offset from the center of the pocket opposite the direction of travel.

48. The method of claim 47, wherein the pocket is angled or offset from a transverse axis of the carrier bar.

49. The method of claim 44, wherein said pellet-shaped articles are further lentil-shaped.

50. A conveyor apparatus for processing pellet-shaped articles in a conveyor along a direction of travel and having at least one processing station, the conveyor apparatus comprising:
a plurality of pockets provided to the conveyor, each pocket adapted to releasably retain a pellet-shaped article, each pocket comprising:
a pocket wall; and
a product settling area included in each pocket and having a dimple defined by an edge, said dimple adapted to seat a bottom side of the pellet-shaped article,
wherein said dimple is offset from a center of said product settling area and said dimple is shaped to position, hold, or bias a portion of the pellet-shaped article towards and/or against a portion of the pocket wall, and
wherein a surface of the product settling area surrounds the dimple.

51. The conveyor apparatus of claim 50, wherein the dimple is positioned such that the pellet-shaped article is held in an asymmetric position relative to the pocket.

52. The conveyor apparatus of claim 50, wherein said dimple is offset from the center of said product settling area opposite of the direction of travel.

53. The conveyor apparatus of claim 50, further comprising:
a chamfer area disposed around the pocket, said chamfer area being defined by a chamfer width and a chamfer angle, wherein the chamfer area extends from the pocket substantially in a direction of travel.

54. The conveyor apparatus of claim 50, wherein said dimple is crowned or conical in shape.

55. The conveyor apparatus of claim 50, wherein said pellet-shaped article is lentil-shaped.

56. The conveyor apparatus of claim 50, wherein said pocket, said product settling area, and said dimple are offset or angled from the direction of travel.

57. The conveyor apparatus of claim 50, wherein said pocket is dimensioned such that at least a portion of a top side of the pellet-shaped article held therein extends outside of the pocket.

58. The conveyor apparatus of claim 50, wherein a depth of said pocket is dimensioned to be greater than, less than, or equal to a height of the pellet-shaped article.

59. The conveyor apparatus of claim 50, wherein the conveyor comprises a conveyor loop, a conveyor belt, a plurality of carrier bars, and/or a carrier drum.

60. The conveyor apparatus of claim 50, further comprising:
at least one processing station to process said pellet-shaped articles.

61. The carrier bar of claim 1, wherein the entire perimeter of the edge of the dimple is spaced from the pocket wall.

62. The carrier bar of claim 1, wherein a surface of the dimple is oriented at a reflex angle about the edge relative to a surface of the product settling area within the pocket.

63. The conveyor apparatus of claim 50, wherein the dimple is separated around its entire perimeter from the pocket wall by a surface of the product settling area.

64. The conveyor apparatus of claim 50, wherein a surface of the dimple is oriented at a reflex angle about the edge relative to a surface of the product settling area within the pocket.

65. The carrier bar of claim 1, wherein the dimple is crowned.

66. The carrier bar of claim 19, wherein the dimple is crowned.

67. The method of claim 44, wherein the dimple is crowned.

68. The conveyor apparatus of claim 50, wherein the dimple is crowned.

* * * * *